United States Patent [19]

Green et al.

[11] Patent Number: 5,575,922
[45] Date of Patent: Nov. 19, 1996

[54] METHOD FOR TREATING MINE WATER USING CAUSTIC SODA

[75] Inventors: Kevin L. Green; Robert N. Skogley, both of Green River, Wyo.

[73] Assignee: Solvay Minerals, Inc., Houston, Tex.

[21] Appl. No.: 497,212

[22] Filed: Jun. 30, 1995

[51] Int. Cl.⁶ ........................................ C02F 1/66
[52] U.S. Cl. .......................... 210/713; 210/724; 210/747; 423/206.2; 423/209
[58] Field of Search ................................. 210/702, 713, 210/724, 747; 423/206.2, 209

[56] References Cited

U.S. PATENT DOCUMENTS

| | | |
|---|---|---|
| 2,625,384 | 1/1953 | Pike et al. . |
| 2,707,171 | 4/1955 | Miller . |
| 2,979,317 | 4/1961 | Bays . |
| 3,050,290 | 8/1962 | Caldwell et al. . |
| 3,084,026 | 4/1963 | Frint et al. . |
| 3,184,287 | 5/1965 | Gancy . |
| 3,269,941 | 8/1966 | Le Compte et al. . |
| 3,655,331 | 4/1972 | Seglin et al. . |
| 3,792,902 | 2/1974 | Towell et al. . |
| 3,817,039 | 6/1974 | Stewart et al. . |
| 3,852,967 | 12/1974 | Stewart et al. . |
| 3,953,073 | 4/1976 | Kube . |
| 4,039,618 | 8/1977 | Gancy et al. . |
| 4,044,097 | 8/1977 | Gancy et al. . |
| 4,044,563 | 8/1977 | Hurst et al. . |
| 4,285,915 | 8/1981 | Saldick et al. . |
| 4,344,650 | 8/1982 | Pinsky et al. . |
| 4,401,635 | 8/1983 | Frint . |
| 4,451,443 | 5/1984 | Libby . |
| 4,577,999 | 3/1986 | Lindorfer et al. . |
| 4,611,951 | 9/1986 | Sapp . |
| 4,696,699 | 9/1987 | Harriett . |
| 4,746,249 | 5/1988 | Haigh et al. . |
| 4,786,211 | 11/1988 | Leutner et al. . |
| 4,869,882 | 9/1989 | Dome et al. . |
| 4,886,393 | 12/1989 | Jahn-Held et al. . |
| 5,004,298 | 4/1991 | Boulanger et al. . |
| 5,043,149 | 8/1991 | Frint et al. . |
| 5,135,734 | 8/1992 | Ninane . |
| 5,192,164 | 3/1993 | Frint et al. . |
| 5,238,664 | 8/1993 | Frint et al. . |
| 5,262,134 | 11/1993 | Frint et al. . |
| 5,283,054 | 2/1994 | Copenhafer et al. . |

FOREIGN PATENT DOCUMENTS 3516138  11/1986  Germany .

*Primary Examiner*—Neil McCarthy
*Attorney, Agent, or Firm*—Brinks Hofer Gilson & Lione

[57] ABSTRACT

A method for treating mine water from an underground trona ore mine comprising pumping the mine water from the mine, introducing caustic soda into the mine water, maintaining the pH of the treated mine water to between about 11.5 and about 14, separating the treated mine water and introducing the treated mine water into an alkali production process.

38 Claims, 1 Drawing Sheet bicarbonate in the mine water react with the caustic soda

METHOD FOR TREATING MINE WATER USING CAUSTIC SODA

BACKGROUND OF THE INVENTION

This invention relates to a method of recovering alkali values from trona ore. In particular, this invention relates to treatment of mine water.

Trona ore is a mineral that contains about 85–95% sodium sesquicarbonate ($Na_2CO_3 \cdot NaHCO_3 \cdot 2H_2O$). A vast deposit of mineral trona is in southwestern Wyoming near Green River. By conservative estimates, this deposit contains about 75 billion metric tons of trona ore.

The sodium sesquicarbonate found in trona ore dissolves in water to yield approximately 5 parts by weight sodium carbonate ($Na_2CO_3$) and 4 parts sodium bicarbonate ($NaHCO_3$). To recover these valuable alkali products, the trona ore must be processed to remove insoluble materials and other impurities.

One such valuable alkali produced from trona is caustic soda (a commercial grade of sodium hydroxide). Caustic soda is one of the largest alkali commodities in the United States. Caustic soda is used in pulp and paper, chemical manufacture and water treatment; and supplies sodium in the manufacture of sodium compounds. Caustic soda is also used in soap, detergent, petroleum refining, textile and aluminum applications.

Typically, 50% caustic soda is produced from trona ore in a process known as "lime-soda (chemical) process," which consumes great quantities of water. In that process, lime is mixed with water to produce "milk of lime" or calcium hydroxide. Milk of lime and sodium carbonate liquor are introduced into caustic reactors to form 12% caustic in a reactor circuit. The by-product, calcium carbonate, is separated from the caustic solution by way of a decantation or thickener system. The calcium carbonate, or "caustic tailings," are washed to remove residual caustic before disposal or recycled to other processes.

Water is a scarce and valuable resource in Wyoming. Water is required to carry sodium carbonate in the form of sodium carbonate liquor into the caustic soda production process. In addition, water is used to wash the caustic tailings before underground placement of the caustic tailings. One source of water is river water from the nearby Green River. However, using river water in the caustic soda process and as a tailings wash is expensive and uses a limited resource.

Another substantial source of water is "mine water." Mine water includes run-offs from tailings deposited in the mined-out cavities and other aqueous streams from the mining process. Because large amounts of tailings from above-ground sodium production processes have been disposed in mines, large quantities of mine water could accumulate in the mines, and could prevent access to trona ore deposits. Thus, it is necessary to remove mine water from such mines.

Mine water contains dissolved trona that can be used to supply sodium carbonate and sodium bicarbonate in sodium production processes. However, mine water also contains impurities from tailings that prevent use of mine water in soda ash production (and similar) processes that can be sensitive to impurities. In addition, mine water can create odor problems. Thus, typically mine water has been collected in large evaporation ponds. Crystallization occurring in such ponds results in crystals with impurities too expensive to separate. Therefore, it has not been commercially feasible to recover sodium values from these crystals.

Therefore, there is a need for a process to remove impurities from mine water so that the treated mine water can be used as a production vehicle in sodium-based chemical processes.

SUMMARY OF THE INVENTION

This invention is a method for treating mine water from underground trona deposits that produces a purified mine water useful in alkali production processes such as caustic soda and soda ash production processes. In this invention, mine water from trona ore deposits is pumped from the mine. Caustic soda is introduced into the mine water so that the caustic soda reacts with the mine water to remove impurities in the mine water. The flow of mine water is adjusted to maintain the pH of the treated mine water between about 11.5 and about 14. The treated mine water is separated from insolubles and introduced to an alkali production process.

In a preferred embodiment of the invention, caustic tailings are used to treat the mine water. In addition to obtaining a treated mine water which can be used as an alkali production vehicle, this embodiment allows the use of mine water as a wash for caustic tailings, resulting in a tailings effluent with lower caustic content.

Thus, this invention offers several advantages over the traditional mine water disposal. It saves water by recycling mine water for use as a production vehicle in alkali production processes. In addition, this invention conserves river water by using mine water to wash caustic tailings before its placement underground.

Further advantages of these process will be apparent from the following drawing and detailed description.

DETAILED DESCRIPTION OF THE PREFERRED EMBODIMENTS

Figure 1:
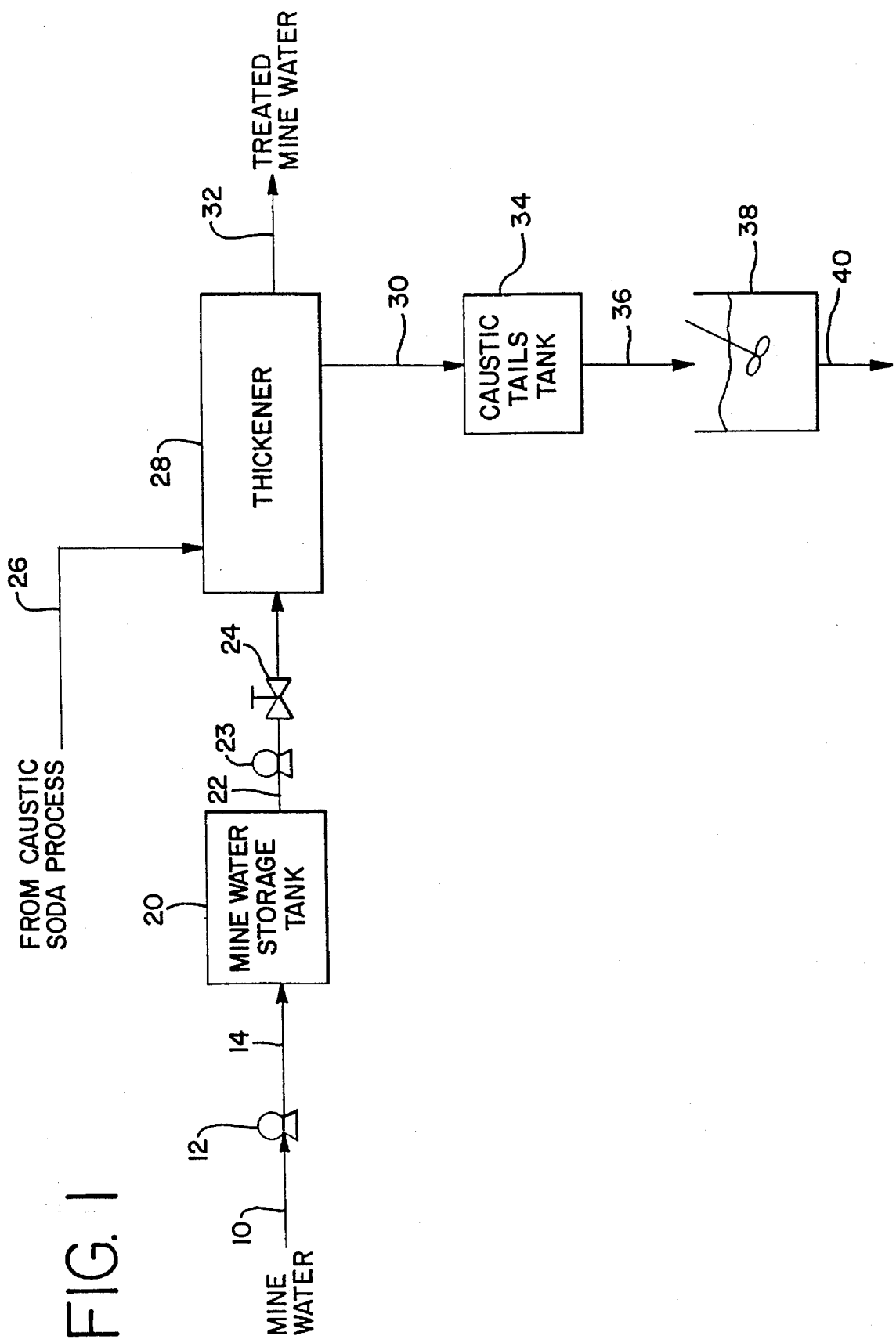
FIG. 1 is a block process flow diagram of one embodiment of the present invention.

The present invention allows the use of mine water as a production vehicle in sodium chemical processes and as a wash for caustic tailings. The present invention is perhaps best understood by reference to the process flow diagram in FIG. 1.

Basically, the invention provides a process for treating mine water from a trona ore deposit with a caustic soda stream to produce a treated mine water with significantly reduced odor and fewer impurities.

In FIG. 1, mine water flows from a trona ore deposit through line 10 and is pumped above ground by pump 12 from an underground sump basin (not shown) to a mine water storage tank 20 through line 14. The mine water is then pumped by pump 23 to thickener 28 through line 22, wherein control valve 24 controls the flow rate. A source of caustic soda is introduced into thickener 28 through line 26 to form a reaction solution (or reaction slurry). The caustic soda reacts with the mine water to form a reaction solution. Insolubles in the reaction solution are allowed to settle in the thickener 28. The treated mine water is recovered from the reaction solution and directed to a sodium-based production process through line 32.

The settled insolubles in the form of a treated slurry are directed to a holding tank 34 through line 30, then to a storage tank 38 through line 36. The treated slurry is then allowed gravity flow through line 40 underground and placed into mined-out cavities in the trona ore deposit.

The mine water in line 10 includes an aqueous solution from calcium carbonate tailings from caustic soda process that were washed and disposed underground in mined-out cavities (not shown) for back-fill. "Back-fill" denotes the process of filling up cavities left by mined-out trona ore. Tailings in the form of a slurry are disposed and contained in these cavities. The aqueous solution drains from the solids that remain in the cavities. The solids harden and additional tailings are deposited over the hardened solids. The aqueous solution that drains from the solids leaches mineral deposits, including trona, in contact with the solution to form mine water. Mine water from the mined-out cavities is collected. Because there is a substantial source of trona in the area surrounding the mined-out cavities, mine water usually reaches equilibrium in the vicinity of the tailings placement area. Mine water is pumped out of the trona ore deposit by pump 12 and directed to mine water storage tank 20 through line 14.

Typically, the mine water in lines 10, 14 and 22 has a temperature of about 70° F., which is roughly equal to the temperature in the trona ore mine. Theoretically, the temperature in line 22 may vary from that in lines 10 and 14 depending on the seasonal temperatures and the residence time of the mine water in tank 20. However, a substantial temperature variance has not been observed.

Preferably, the mine water in lines 10, 14 and 22 is an essentially saturated solution of sodium carbonate ($Na_2CO_3$) and sodium bicarbonate ($NaHCO_3$), containing amounts of sodium carbonate and sodium bicarbonate which approach the saturation concentrations. In the mine water, the composition of sodium carbonate ($Na_2CO_3$) and sodium bicarbonate ($NaHCO_3$) is between about 12% and about 17.5% $Na_2CO_3$ by weight of the solution and between about 3% and 5% $NaHCO_3$ by weight of the solution. More typically, the mine water contains between about 12.5% and about 14% $Na_2CO_3$ and between about 3.5% and 4.0% $NaHCO_3$.

Impurities in the mine water in lines 10, 14 and 22 make up about 1% by weight of the solution. These impurities may include chlorides, sulfides, sulfites, sulfates, iron pyrite from shale insolubles and dissolved organic compounds. Impurities in the mine water impart a putrid green color so the light transmittance of the mine water has been observed to be about 60 percent.

The source of caustic soda used in the mine water treatment can be a product stream or caustic tailings from the caustic soda process. In thickener 28, the caustic soda source from line 26 combines with the sodium bicarbonate from the mine water from line 22 in accordance to formula I, thus forming a reaction solution that has an increased amount of sodium carbonate.

$$NaHCO_3 + NaOH \rightarrow Na_2CO_3 + H_2O \quad (I)$$

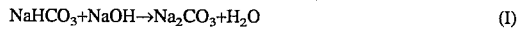

Preferably, the caustic soda source is a caustic tailings stream (i.e. the caustic-laden aqueous slurry by-product from the production of caustic soda). In FIG. 1, the caustic tailings stream in line 26 is a slurry which has been washed once with river water (not shown). In addition to containing between about 1% and about 6% caustic soda by weight of the solution, caustic tailings stream in line 26 may include between about 0.1% and about 1.0% sodium carbonate by weight of the solution, between about 0.1% and about 2.0% slaked lime ($Ca(OH)_2$) by weight of the total stream, and between about 30% and 50% calcium carbonate ($CaCO_3$) by weight of the total stream.

Using caustic tailings as the caustic soda source for treating the mine water provides the added benefit of reducing the caustic soda content in the tailings for safer underground placement of those tailings. It has been found that the caustic soda residue in such untreated tailings can help to dissolve trona pillars left to support the mine roof. The caustic soda in the tailings reacts with the sodium bicarbonate portion of the trona with which it contacts according to formula II:

$$Na_2CO_3 \cdot NaHCO_3 \cdot 2H_2O + NaOH \rightarrow 2Na_2CO_3 + 3H_2O \quad (II)$$

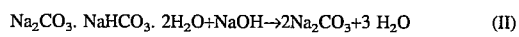

This reaction is localized in the slurry placement area and helps to dissolve additional trona. Such dissolution is undesirable. Thus, it is preferred to reduce the caustic soda content in the tailings.

Another added benefit of this embodiment of the invention is that caustic tailings may contain slaked lime. It is believed that this slaked lime binds with impurities such as organics and sulfides during reaction with sodium bicarbonate from the mine water when forming calcium carbonate. Regardless of the chemical reaction, it is believed that the impurities precipitate out of the reaction solution and are placed with the calcium carbonate in the mined-out cavities. This invention thereby aids in the removal of impurities from the mine water of line 22 which otherwise would give off a foul odor and/or reduce light transmission.

Preferably, the caustic tailings stream in line 26 contains between about 30% and about 40% calcium carbonate by weight of the total stream. More preferably, about 35% calcium carbonate by weight. Typically, the caustic tailings stream in line 26 has a temperature between about 170° F. to about 180° F. and contains less than about 6% caustic soda by weight of the solution. A preferable caustic soda content in line 26 is between about 1.5 to about 3% by weight of the solution. More preferably, the caustic tailings stream in line 26 contains between about 1.5% to about 2% caustic soda by weight of the solution.

It is also preferred that a flocculating agent (not shown) is mixed with the caustic tailings stream from line 26 in the thickener 28. This flocculating agent should be used in an amount that would aid in the aggregation and binding of the solids from the caustic tailings stream. It is believed that any appropriate flocculating agent as selected by one skilled in the art can be used in the present process. For example, polyacrylamide can be used when the pH in thickener 28 is above about 12. Alternatively, a cationic-anionic polymer, such as aluminum sulfate, may be used as the flocculating agent when the pH is equal to or less than about 12.

The temperature in thickener 28 reaches an equilibrium temperature between about 80° F. and 105° F., depending on the flow rates and temperatures of the incoming feed streams 22 and 26. In FIG. 1, the thickener 28 used in this embodiment is a vessel with feed lines 22 and 26 on one end of the thickener 28 and effluent lines 30 and 32 in the center of the vessel. Line 30 which carries insolubles is located at the bottom of the thickener. Insolubles from the feed lines 22 and 26 and resulting from chemical reactions are allowed to settle in thickener 28. A rake-like apparatus (not shown) is then used to gravity suspend the settled insolubles which discharge from line 30.

It is preferred that the thickener 28 provide a constant source of treated mine water for use as a production vehicle in sodium-based production processes. Maintaining a steady flow in line 32 is also preferable to prevent plugging and freezing in the pipes. Thus, the mine water storage tank 20 has a large capacity to ensure that a steady supply of treated mine water is available, even in those times when the mine cannot supply a steady stream.

The pH in the reaction solution should be maintained so that an excess amount of caustic soda remains in the treated mine water. The treated mine water in line 32 has a pH value of between about 11.5 and about 14. In a preferred embodiment of the invention, the treated mine water has a pH of between about 11.5 and about 13. Most preferably, the treated mine water in line 32 has a pH value of about 12.5. At a pH of about 11.5, the treated mine water still imparts a sulfide odor, while at a pH of about 12.5 the sulfide odor is significantly reduced. Operation at a pH significantly above 12.5 wastes valuable caustic soda content of the caustic tailings stream, as well as fails to neutralize the caustic tailings stream to aid in its placement underground. In addition, treated mine water with a pH of about 12.5 is clearer, as indicated by a light transmittance measurement that was observed to be about 90%. Moreover, treatment of the mine water to a pH of about 12.5 precipitates the iron from the mine water. Iron compounds can foul the equipment and place impurities in the product in the sodium-based processes. The latter is especially a concern in soda ash production processes.

Maintenance of the pH in the reaction solution can be achieved by either varying the flow rate of the mine water in line 22 while feeding the caustic tailing through line 26 at a constant flow rate, or varying the flow rate through line 26 while maintaining a constant flow rate through line 22. It is preferred that caustic tailings stream is fed through line 26 at a constant flow rate and that the flow rate of the mine water through line 22 is varied by control valve 24 in order to maintain the pH value of the reaction solution.

The flow rates in lines 22 and 26 also depend upon the capacity of the mine water treatment facility. For example, for a facility in which the caustic tailings stream in line 26 has a constant flow rate of about 180 gal/min, the preferred flow rate of the mine water in line 22 is between about 100 to about 300 gal/min. The more preferred flow rate in line 22 is between about 250 and about 300 gal/min.

The treated mine water in line 32 is a sodium carbonate liquor containing between about 8% to about 12% sodium carbonate by weight of the total stream, less than about 1.5% caustic soda by weight of the total stream and between about 85% to about 90% water by weight of the total stream. Preferably, the treated mine water in line 32 contains less than about 1% caustic soda by weight of the total stream. More preferably, the treated mine water contains about 0.5% caustic soda by weight of the total stream. It is desirable that essentially all of the sodium bicarbonate in line 22 is converted to sodium carbonate because sodium bicarbonate can cause undesirable effects such as foaming, corrosion and reduced product quality in sodium-based chemical processes, particularly soda ash production processes.

The temperature and flow rate of the treated mine water in line 32 may vary depending upon the capacity of the mine water treatment facility. For example, for a facility in which the caustic tailings stream in line 26 has a constant flow rate of about 180 gal/min, the temperature in line 32 is between about 80° F. and about 105° F. Treated mine water in the present example is carried to one or more sodium production process to be used as a production vehicle through line 32 at a flow rate of between about 250 and about 300 gal/min. Preferably, line 32 connects with a soda ash production process. Most preferably, this soda ash production process is a "monohydrate process." For example, the treated mine water may be used as a weak liquor in this process.

The concentrate containing treated caustic tailings in line 30 in the present example has a flow rate of about 200 gal/min, and has the same temperature, pH and compositions of sodium carbonate, caustic soda and water as the treated mine water in line 32. The treated caustic tailings concentrate in lines 30 and 36 is a slurry containing between about 30% to about 50% calcium carbonate by weight of the total stream. Preferably, the calcium carbonate content in lines 30 and 36 is between 30% to about 40% by weight of the total stream. More preferably, the treated caustic tailings in lines 30 and 36 contain about 35% calcium carbonate by weight of the total stream.

The treated slurry is directed to storage tank 38 in preparation for placement underground. Tailings from other processes can be combined with caustic tailings in storage tank 38 for placement underground. Such tailings can include, for example, insolubles from calcined trona from a soda ash process and boiler ash tailings. Preferably, tailings containing impurities that could contaminate the mine water, such as fly ash tailings, are not combined in storage tank 38 for placement underground.

Storage tank 38 is equipped with a mixing means such as an air sparger to ensure that the solids in line 40 remain suspended. The tailings slurry in line 40 is directed underground by gravity flow at a preferred rate of between about 600,000 gallons to about 700,000 gallons per day. Line 40 connects to an underground pipeline (not shown) placed in a mine shaft. This pipeline branches off into a mined-out cavity having a depth of about 1600 feet. The tailings slurry in line 40 is strategically placed at various locations simultaneously in a mined-out cavity. The aqueous solution is drained from the solids and forms mine water which in turn is collected by line 10 for treatment. Preferably, the slurry in line 40 contains from about 35% to about 40% solids. More preferably, the slurry in line 40 contains about 35% solids. At the preferred slurry concentration, the solid content stacks and drains better. Typically, it takes several months for all of the aqueous solution to be drained from the slurry, collected as mine water, pumped back to the surface and treated for use in a production process.

Therefore, the present invention saves water by recycling mine water for use as a production vehicle in alkali production processes. More advantageously, the mine water treatment process of the present invention supplies a source of sodium carbonate for use in soda ash production processes, processes that are highly sensitive to impurities, without requiring further purification. In addition, this invention conserves river water by using mine water to wash and neutralize caustic tailings before placement underground. Moreover, the present invention minimizes the caustic content of the tailings and thereby reduces the dissolution rate of the trona pillars by the solution in the slurry. This latter advantage allows for safe, controlled and accessible placement of the tailings slurry from the surface process for refining caustic soda.

It is intended that the foregoing detailed description be regarded as illustrative rather than limiting, and that it be understood that it is the following claims, including all equivalents, which are intended to define the scope of this invention.

What is claimed is:

1. A method for treating mine water from a trona ore deposit, wherein the mine water contains sodium carbonate and sodium bicarbonate, the method comprising:

pumping the mine water from the trona ore deposit;

introducing a tailings stream including an amount of caustic soda into the mine water to form a reaction solution;

maintaining a pH of between about 11.5 and about 13 in the reaction solution;

separating a treated mine water from the reaction solution to form a concentrate;

introducing the treated mine water into an alkali production process.

2. The method of claim 1 wherein said mine water comprises a substantially saturated solution of sodium carbonate and sodium bicarbonate.

3. The method of claim 1 wherein said tailings stream comprises a caustic tailings stream.

4. The method of claim 3 wherein said caustic tailings stream comprises less than 6 weight percent sodium hydroxide.

5. The method of claim 3 wherein said caustic tailings stream comprises between about 1.5 and about 3 weight percent sodium hydroxide.

6. The method of claim 3 wherein said caustic tailings stream comprises between about 1.5 and about 2 weight percent sodium hydroxide.

7. The method of claim 3 wherein said concentrate comprises a treated slurry containing treated caustic tailings having between about 30 weight percent and about 50 weight percent solids.

8. The method of claim 7 further comprising directing the treated slurry into the trona ore deposit by gravity flow.

9. The method of claim 1 wherein said treated mine water has a temperature of between about 80° F. and about 105° F.

10. The method of claim 1 wherein said treated mine water contains between about 8 weight percent and about 12 weight percent sodium carbonate.

11. The method of claim 1 wherein said treated mine water contains less than about 1.5 weight percent sodium hydroxide.

12. The method of claim 1 wherein said treated mine water contains less than about 1 weight percent sodium hydroxide.

13. The method of claim 1 wherein said treated mine water contains about 0.5 weight percent sodium hydroxide.

14. The method of claim 1 wherein said alkali production process is a soda ash production process.

15. The method of claim 1 wherein said pH is maintained at about 12.5.

16. A method for treating mine water from a trona ore deposit, wherein the mine water contains a substantially saturated solution of sodium carbonate and sodium bicarbonate, the method comprising:

pumping the mine water from the trona ore deposit;

introducing an amount of caustic tailings into the mine water to form a reaction solution;

maintaining a pH of between about 11.5 and about 13 in the reaction solution;

separating a treated mine water from the reaction solution to form a treated slurry;

introducing the treated mine water into an alkali production process;

directing the treated slurry into the trona ore deposit by gravity flow.

17. The method of claim 16 wherein said treated slurry comprises between about 30 weight percent and about 50 weight percent solids.

18. The method of claim 16 wherein said treated slurry comprises about 35 weight percent solids.

19. The method of claim 16 further comprising placing the treated slurry in a mined-out trona cavity.

20. A method for treating a caustic tailings stream derived from a causticization process, wherein said caustic tailings stream comprises calcium carbonate and sodium hydroxide, said method comprising:

introducing mine water to the caustic tailings stream to form a reaction slurry, said mine water comprising sodium carbonate and sodium bicarbonate from a trona ore deposit;

reacting sodium hydroxide in the reaction slurry with sodium bicarbonate to form sodium carbonate;

removing a sodium carbonate liquor from the reaction slurry to form a treated slurry comprising solids and an aqueous solution;

directing the treated slurry into the trona ore deposit.

21. The method of claim 20 further comprising placing the treated slurry in a mined-out trona cavity in the trona ore deposit.

22. The method of claim 20 wherein said treated slurry is directed into the trona ore deposit by gravity flow.

23. The method of claim 20 wherein said caustic tailings stream comprises less than about 6 weight percent sodium hydroxide.

24. The method of claim 20 wherein said caustic tailings stream comprises between about 1.5 and about 3 weight percent sodium hydroxide.

25. The method of claim 20 wherein said caustic tailings stream comprises between about 1.5 and about 2 weight percent sodium hydroxide.

26. The method of claim 20 wherein said mine water comprises a substantially saturated solution of sodium carbonate and sodium bicarbonate.

27. The method of claim 20 wherein said treated slurry comprises between about 30 weight percent to about 50 weight percent solids.

28. The method of claim 20 wherein said treated slurry comprises about 35 weight percent solids.

29. The method of claim 20 wherein said sodium carbonate liquor comprises between about 8 weight percent and about 12 weight percent sodium carbonate.

30. The method of claim 20 wherein said treated slurry comprises less than about 1.5 weight percent sodium hydroxide.

31. The method of claim 20 wherein said treated slurry comprises less than about 1 weight percent sodium hydroxide.

32. The method of claim 20 wherein said treated slurry comprises less than about 0.5 weight percent sodium hydroxide.

33. The method of claim 20 wherein said sodium carbonate liquor has a pH between about 11.5 and about 14.

34. The method of claim 20 wherein said pH is between about 11.5 and about 13.

35. The method of claim 20 wherein said pH is about 12.5.

36. The method of claim 20 wherein said sodium carbonate liquor and reaction slurry have a respective temperature of between about 80° F. and about 105° F.

37. The method of claim 20 further comprising recovering the sodium carbonate liquor for use in an alkali production process.

38. The method of claim 37 wherein said alkali production process is a monohydrate production process.

\* \* \* \* \*